E. MULLER,
Assignor, by mesne assignments, to THE NEW YORK TARTAR COMPANY.
MANUFACTURE OF CREAM OF TARTAR.
No. 10,011. Reissued Jan. 17, 1882.
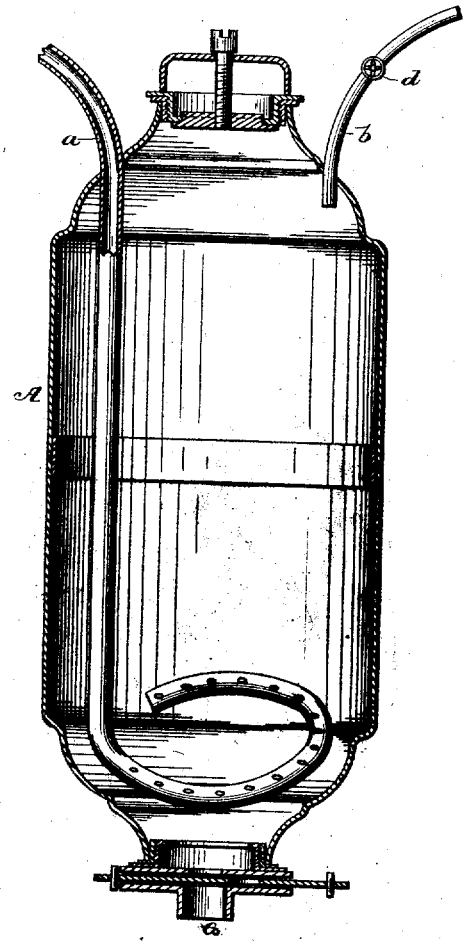
Witnesses,
Daniel H. Driscoll.
William F. Hapgood.
Inventor:
Edward Muller
By Gifford & Gifford
Attys.

UNITED STATES PATENT OFFICE.

EDWARD MULLER, OF NEW YORK, N. Y., ASSIGNOR, BY MESNE ASSIGNMENTS, TO THE NEW YORK TARTAR COMPANY.

MANUFACTURE OF CREAM OF TARTAR.

SPECIFICATION forming part of Reissued Letters Patent No. 10,011, dated January 17, 1882.

Original No. 222,598, dated December 16, 1879. Application for reissue filed December 24, 1881.

*To all whom it may concern:*

Be it known that I, EDWARD MULLER, a citizen of the United States, residing at New York, in the county and State of New York, have invented an Improved Process of Treating Argols in the Manufacture of Cream of Tartar, of which the following is a specification.

The accompanying drawing represents a sectional elevation of the apparatus used for carrying my improved process into effect.

This invention relates to a new process of obtaining pure cream of tartar from argols, and for completely separating therefrom the tartrate of lime and other matter contained in the argols.

Usually cream of tartar is obtained for the market by treating the argols with certain chemicals, as is, for example, described in Letters Patent No. 217,235. Argols have also been subjected, while being dissolved in the presence of chemicals, to the pressure of steam in a closed vessel unprovided with any means for the escape of steam, as is described in Letters Patent No. 183,597.

My invention consists in treating the argols in the presence of water with steam under pressure within a vessel from which the steam is permitted to escape during the operation of the process, and I believe that I have made two important improvements on the old processes above referred to, in that I provide for and regulate the escape of the steam from the vessel in which the argols are being dissolved under pressure, and I dispense with the use of all chemicals in obtaining a pure cream of tartar from argols.

My process is as follows: A vessel, A, having a capacity of, say, four thousand gallons (more or less) is filled about half-full with water, and about six thousand pounds of argols are then put into the water. Steam under a pressure of about sixty pounds (more or less) is then let into the vessel A through a pipe, *a*, which preferably leads into the lower part of the vessel, and is there pierced with fine holes, so that the steam will enter and permeate the water in diminutive jets.

A steam-escape pipe, *b*, connects with the upper part of the vessel A, and is opened to the requisite extent by means of a suitable valve or cock, *d*, so that the steam is free to escape from the vessel, but not as fast as it is admitted thereto. By thus admitting the steam into the water containing the argols violent boiling is effected, which, taking place under pressure, serves to rapidly dissolve the bitartrate of potassa contained in the argols. The pressure should be gradually augmented by gradually reducing the escape-opening in the pipe *b*, and after the boiling has thus taken place for about one hour the escape-pipe *b* may be entirely closed, or nearly so. Within a space of about three hours from the commencement the cream of tartar will be completely dissolved in the water, the tartrate of lime and other impurities falling to the bottom.

The proportions above given may of course be varied, in which case the extent of time above mentioned is also proportionately changed.

After the steam has affected the water and the argols in manner stated, a further supply is cut off, and the vessel, with its contents, left undisturbed for about two days, to allow the dissolved cream of tartar to crystallize on the inner walls of the vessel. At the end of this period the water, with the sediment impurities, is discharged from the vessel through a lower outlet, *c*, and then the crystals of cream of tartar are removed.

By boiling the argols in water in the manner stated—that is to say, with the aid of steam let into the water—a high temperature is obtained, and the cream of tartar is positively dissolved, while the tartrate of lime is precipitated, it being sufficient for this purpose to introduce into the vessel at the commencement of the process about one gallon of water for each three pounds of argols, as before specified. The violent commotion caused by the introduction of steam assists the process materially, both as to thoroughness of separation and rapidity of action.

Thus it will be seen that my process is economical and productive of very satisfactory results in yielding the pure cream of tartar.

What I claim is—

1. The process of manufacturing cream of tartar from argols, which consists in exposing the argols in the presence of water alone, in about the proportions specified, to the action of steam under pressure of about sixty pounds to the inch, the steam being injected into the water, causing it to boil, and being permitted to escape from the converting-vessel, and finally separating the cream of tartar after crystallization, substantially as described.

2. The improvement in the art of treating argols to obtain a solution of the same, which consists in subjecting the argols while being dissolved to the pressure of steam admitted into a closed vessel near the bottom, and allowing the escape of the same, substantially as described.

In testimony whereof I have hereunto set my hand in the presence of two witnesses.

EDWARD MULLER.

Witnesses:
WM. E. PREECE,
JNO. C. MACKINNEY.